(12) United States Patent
De'Longhi

(10) Patent No.: US 7,173,217 B2
(45) Date of Patent: Feb. 6, 2007

(54) ELECTRIC OVEN

(75) Inventor: Giuseppe De'Longhi, Treviso (IT)

(73) Assignee: DeLonghi S.p.A., Treviso (IT)

( * ) Notice: Subject to any disclaimer, the term of this patent is extended or adjusted under 35 U.S.C. 154(b) by 0 days.

(21) Appl. No.: 11/102,560

(22) Filed: Apr. 5, 2005

(65) Prior Publication Data
US 2005/0252905 A1  Nov. 17, 2005

(30) Foreign Application Priority Data
Apr. 9, 2004  (IT) .......................... MI2004A0715

(51) Int. Cl.
| | |
|---|---|
| *F24C 15/16* | (2006.01) |
| *F24C 15/02* | (2006.01) |
| *A21B 1/50* | (2006.01) |
| *A21B 3/02* | (2006.01) |
| *A21B 3/07* | (2006.01) |

(52) U.S. Cl. ...................... 219/392; 219/391; 219/393; 126/340

(58) Field of Classification Search ...................... None
See application file for complete search history.

(56) References Cited

U.S. PATENT DOCUMENTS

| | | | | |
|---|---|---|---|---|
| 1,793,955 A | * | 2/1931 | Otte ............................ | 126/340 |
| 1,855,561 A | * | 4/1932 | Ritthaler ...................... | 126/340 |
| 1,885,404 A | * | 11/1932 | Bamberg et al. ............. | 126/340 |
| 1,987,087 A | * | 1/1935 | Underwood .................. | 126/340 |
| 2,098,729 A | * | 11/1937 | Myers et al. ................ | 312/269 |
| 2,979,054 A | * | 4/1961 | Jenkins ........................ | 126/340 |
| 2,987,363 A | * | 6/1961 | Morse ......................... | 312/274 |
| 3,106,202 A | * | 10/1963 | Arduna ........................ | 126/340 |
| 3,193,663 A | * | 7/1965 | Tadeusz et al .............. | 219/405 |
| 3,830,220 A | * | 8/1974 | Demetreon .................. | 126/340 |
| 4,637,373 A | * | 1/1987 | Shirai et al. ................. | 126/340 |

FOREIGN PATENT DOCUMENTS

DE  2352889 A  *  4/1975

* cited by examiner

*Primary Examiner*—Joseph Pelham
(74) *Attorney, Agent, or Firm*—Andrew Wilford

(57) ABSTRACT

An oven has a housing defining a cooking chamber. Guides in the chamber carrying a slidable rack. A door hinged on the housing and pivotal between an open position and a closed position. A linkage between a side wall of the cooking chamber and the housing for automatically ejecting the frame on movement of the door into the open position. The linkage is oriented in a vertical plane and has a lever pivoted in the housing outside the chamber, a link connecting the lever to the door such that the lever pivots when the door is moved between its positions, and a thruster element pivoted between the housing and the chamber and having a first outer part outside the cooking chamber and slidably engaged in a slot of the lever and a second inner part inside the cooking chamber and slidably engaged in an opening of the rack.

17 Claims, 6 Drawing Sheets

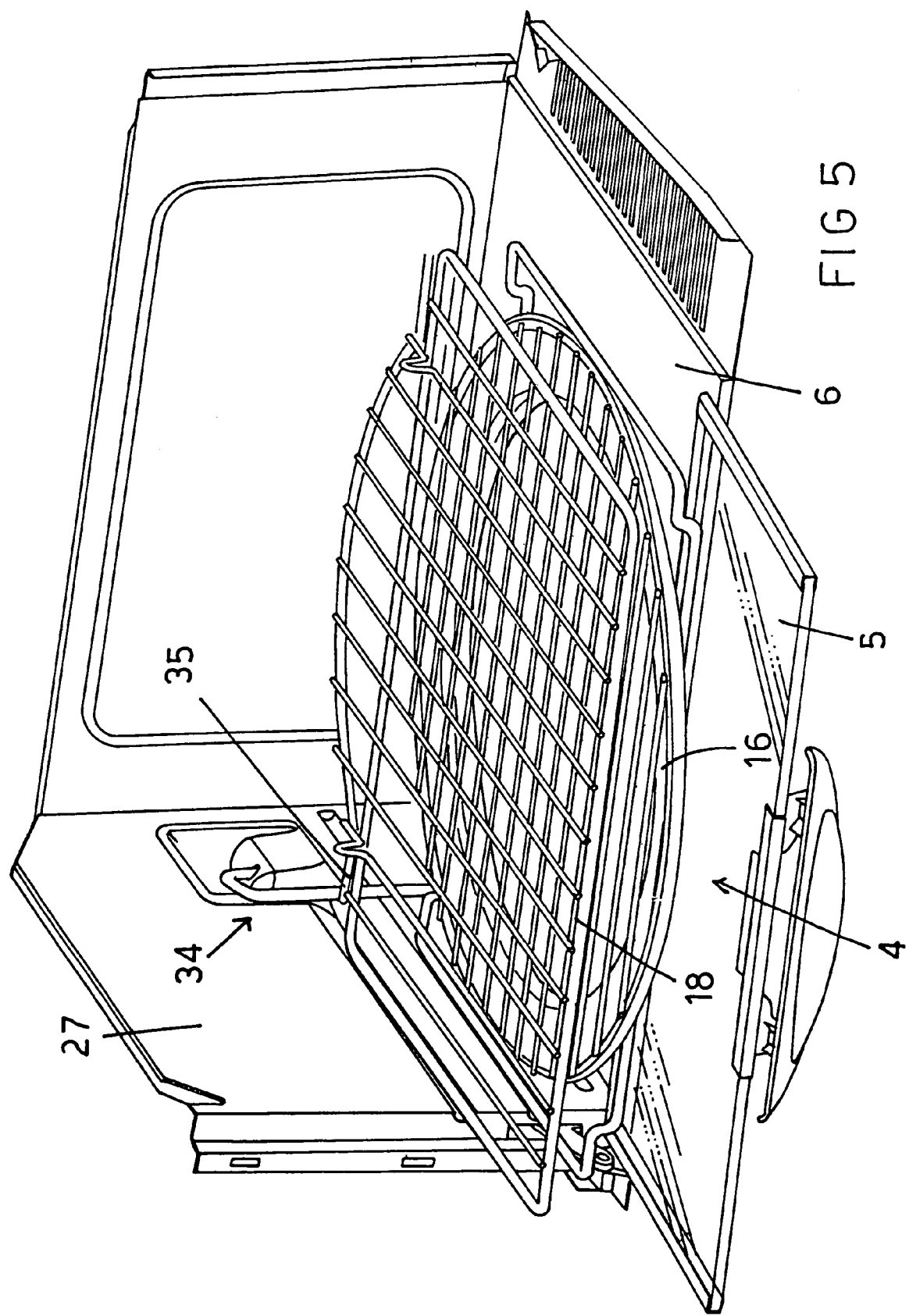

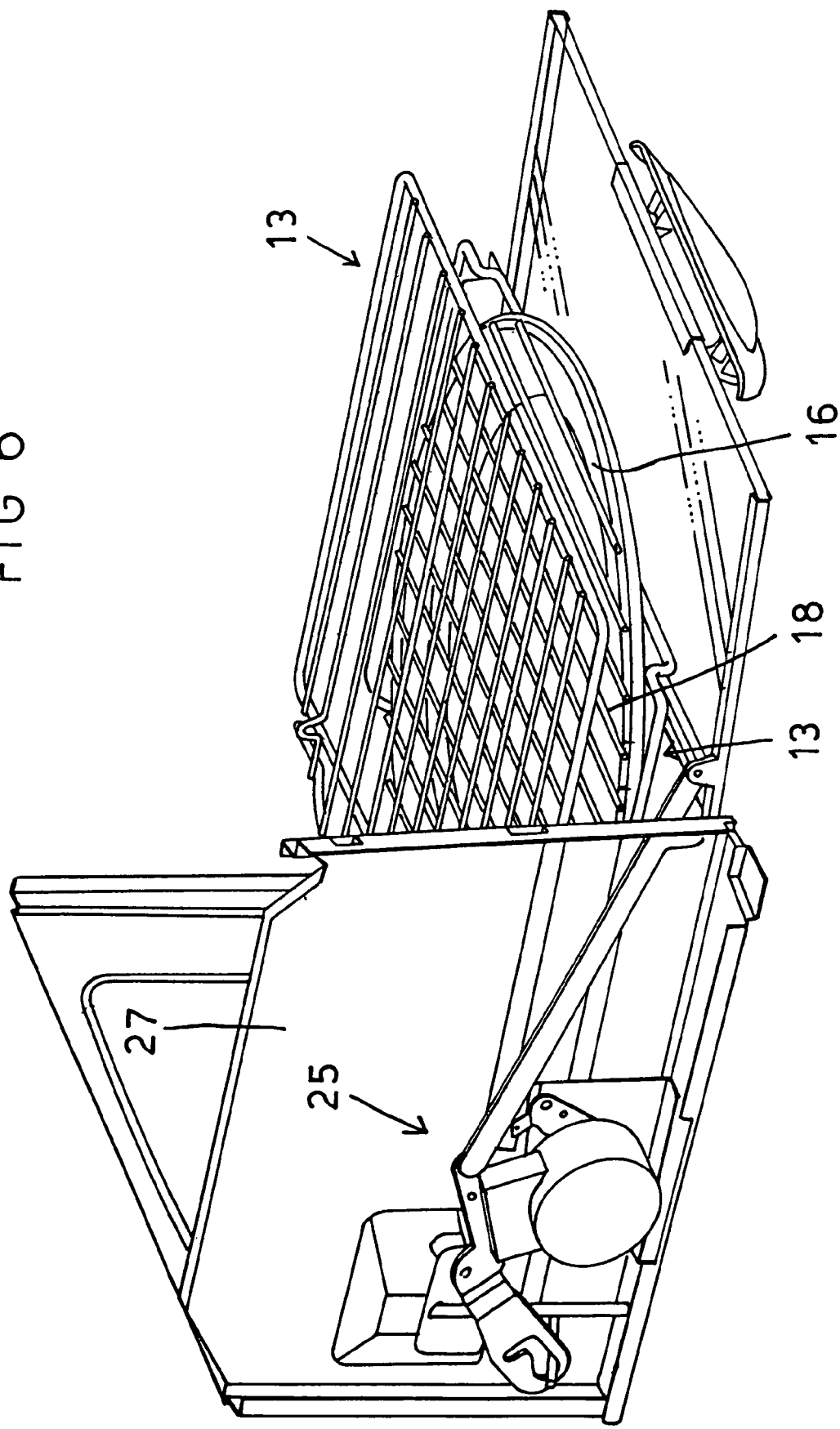

ELECTRIC OVEN

The present invention refers to an electric oven in particular for cooking or heating food products.

In particular, hereafter reference shall be made to ovens equipped with one or more electrical resistances capable of irradiating energy in the form of infrared radiation.

In such apparatuses one or more frames are foreseen, generally in the form of metal wire grids, for directly supporting the food or trays containing food to be cooked or roasted.

One of the drawbacks of conventional cooking apparatuses during cooking consists of the fact that. to obtain a homogeneous distribution of heat and an equally homogeneous cooking or browning of the food it is necessary to withdraw the trays from the cooking chamber to mix the food or turn the trays, involving a waste of energy that is lost with the opening of the door of the apparatus, a lengthening of the cooking times and the need for the operator to be present looking over the food.

In some cooking devices, for example in many microwave ovens, the support plate for the food or for a tray containing the food is made to rotate by a mechanism that foresees a pulling piston that engages the plate centrally and at the bottom.

Such a system could only be implemented in an oven of the type referred to above by eliminating the crumb tray arranged below the resistances that produce the heating and therefore would cause a substantial complication of the cleaning operations.

Indeed, foreseeing such a system in an oven of the type described above would prevent frontward ejection from the crumb tray.

Another drawback of conventional ovens consists of the fact that it allows a single frame arranged at a predetermined height in the cooking chamber to be removed.

Yet another drawback of conventional ovens is that the ejection system of such a frame can have a substantial metal mass that introduces a thermal inertia that hinders the correct roasting or browning of food.

The technical task proposed of the present invention is, therefore, that of making an electric oven in particular for cooking or heating food that allows the aforementioned technical drawbacks of the prior art to be eliminated.

In this technical task a purpose of the invention is that of making an electric oven in particular for cooking or heating food that allows optimal cooking without lengthening cooking times and/or without wasting energy and/or without requiring the operator to be present watching over the food. Another purpose of the invention is that of making an electric oven in particular for cooking or heating food that allows many frames to be removed simultaneously from the cooking chamber without the cleaning operations being penalized and/or without complicating the frontal ejection of the crumb tray.

The last but not least purpose of the present invention is that of making an electric oven in particular for cooking or heating food that allows the maximum possible flexibility of use allowing the frames to be interchanged keeping the functionality of the apparatus unchanged.

The last but not least purpose of the invention is that of making an electric oven in particular for cooking or heating food that allows a correct roasting and/or browning of food.

The technical task, as well as these and other purposes, according to the present invention, are accomplished by making an electric oven in particular for cooking or heating food, comprising a cooking chamber housing one or more removable frames suitable for supporting said food and slidably engaged with corresponding side guides of said cooking chamber, characterized in that it has at least one rotatable frame supported by one of said removable frames, and rotation actuation means of said rotatable frame positioned peripherally and tangentially to it.

The present invention also discloses a electric oven in particular for cooking or heating food, comprising a cooking chamber having one or more removable frames engaged with corresponding guides, and a closing door hinged at the open front side of said cooking chamber, characterized in that it has simultaneous ejection means of said one or more removable frames.

Other characteristics of the present invention are defined, moreover, in the subsequent claims.

Further characteristics and advantages of the invention shall become clearer from the description of a preferred but not exclusive embodiment of the oven according to the finding, illustrated for indicating and not limiting purposes in the attached drawings, in which.

Figure 1:
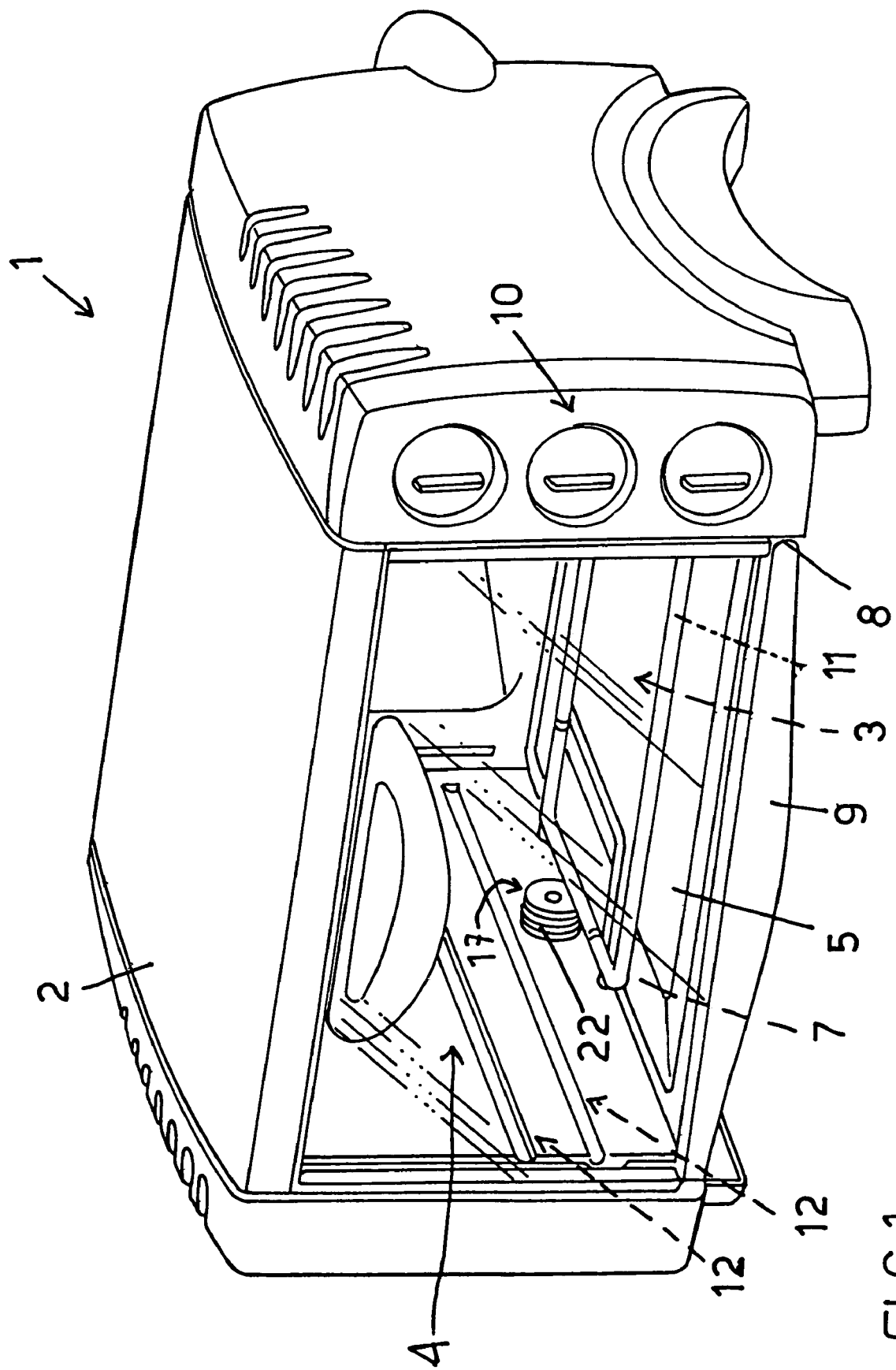
FIG. 1 shows a perspective view from the front side of a preferred way of making the cooking apparatus of the present finding, in which for the sake of clarity the frames have been removed from the cooking chamber.
Figure 2:
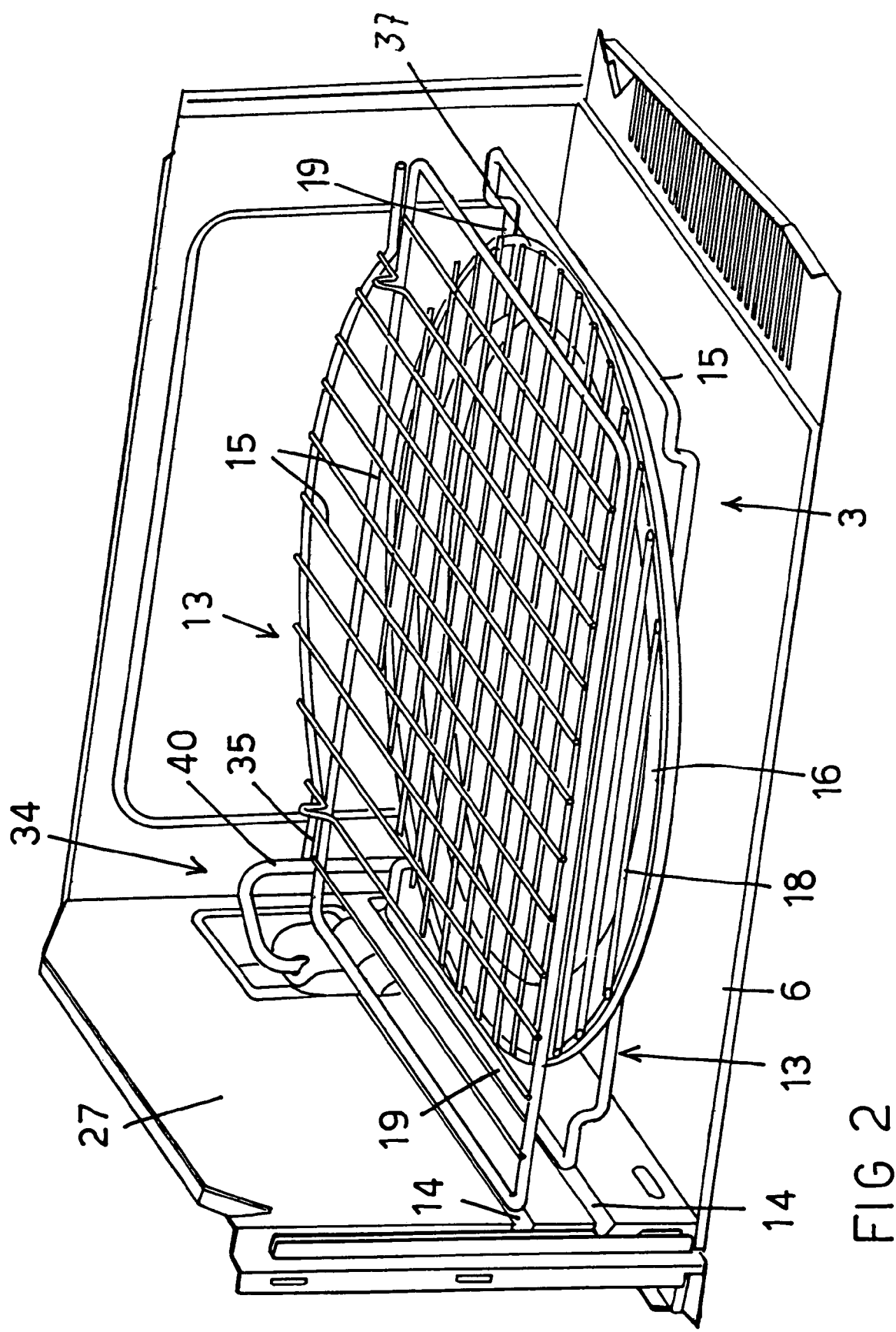
FIG. 2 shows a perspective view from the front side of the cooking chamber of the device of FIG. 1, in which two removable frames are illustrated (with the door of the cooking chamber in closed position) one of which carries the rotatable frame.
Figure 3:
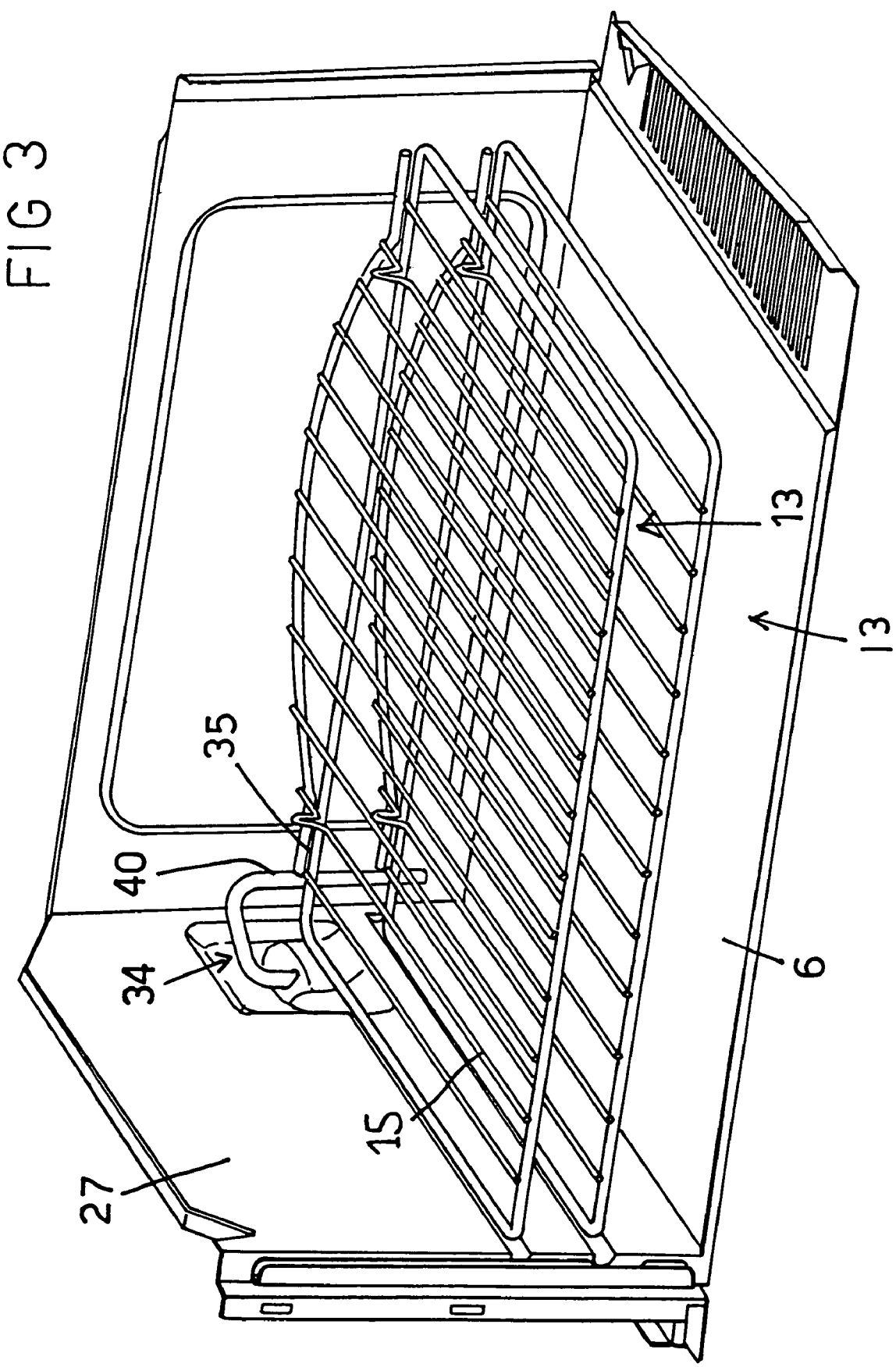
FIG. 3 shows a perspective view from the front side of the cooking chamber of the device of FIG. 1, in which two identical removable frames are illustrated (with the door of the cooking chamber in closed position) that can be used should it not be necessary to rotate the food to be cooked inside the cooking chamber.
Figure 4:
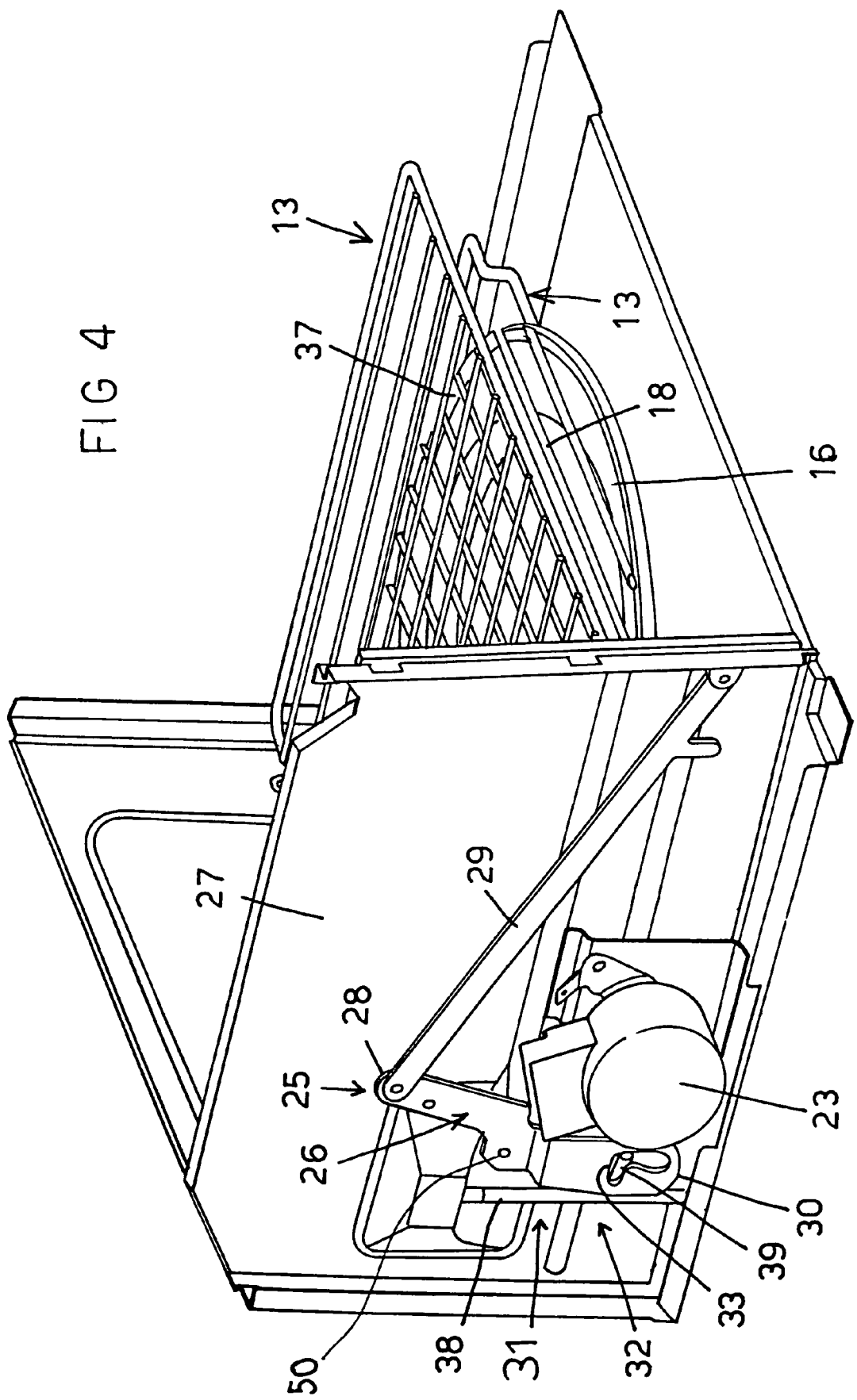
FIG. 4 shows a perspective view from an outer side of the cooking chamber of the device of FIG. 1, in which the ejection system is in the configuration corresponding to the door of the cooking chamber being closed.

FIG. 5 shows a different perspective view from an inner side of the cooking chamber of the device of FIG. 1, in which the ejection system is in the configuration corresponding to the door of the cooking chamber being open; and FIG. 6 shows a perspective view from an outer side of the cooking chamber of the device of FIG. 1, in which the ejection system is in the configuration corresponding to the door of the cooking chamber being open.

With reference to the quoted figures, an electric oven in particular for cooking or heating food products is shown wholly indicated with reference numeral 1.

The oven 1 has an outer casing 2 in which a cooking chamber 3 is housed having a front side 4 closed by a door 5 hinged preferably about a horizontal axis arranged substantially at the base of the same front side 4 of the cooking chamber 3.

The bottom 6 of the cooking chamber 3 slidably supports a crumb tray 7 that can be removed from the front side of the oven 1 through a slit situated between the bottom 6 itself of the cooking chamber 3 and the door 5.

Preferably, the crumb tray 7 in withdrawn position in the cooking chamber 3 extends outside the cooking chamber 3 with a handle 9 for moving it.

In the space between the outer casing 2 and a lateral side of the cooking chamber 3 there are the command devices (not illustrated), the operating parameters of which (for example cooking time and temperature) can be controlled by the operator through suitable adjustment knobs 10 situated on the front side of the oven 1 to one side of the door 5.

Inside the cooking chamber 3, immediately above the crumb tray 7, a first electrical resistance 11 is positioned horizontally suitable for cooking the food.

Preferably, at least a second electrical resistance (not shown) is also positioned horizontally immediately below the top side of the cooking chamber 3.

The cooking chamber 3 has pairs of opposite lateral guides 12 in which corresponding removable frames 13 slidably engage, in particular pairs of opposite guides 12 formed as horizontal grooves 14 of the side walls of the cooking chamber 3 and suitable for receiving the side edges of the, removable frames 13.

Each removable frame 13 consists of one or more metal filiform elements 15, rectilinear and/or shaped and/or intertwined and connected to form a grid, since the structure must not hinder a correct and homogeneous distribution of the heat and at the same time must ensure that crumbs or whatever else coming from the cooking and/or roasting of the food can be collected by the tray 7.

The removable frames 13 are intended to support the food directly or through a cooking container.

At least one removable frame 13, in particular the bottom one, can also be intended to support a rotatable frame 16 that can be made to rotate by suitable actuation means 17 positioned tangentially and peripherally to it (FIG. 1).

The rotatable frame 16, supported by the removable frame 13, is in turn intended to directly or indirectly support the food to be cooked, and it can be made to rotate by actuation is means 17 about a vertical axis substantially passing through its center.

In the preferred embodiment illustrated here the rotatable frame 16 has a circular outer perimeter and a section suitable for supporting, coaxially or fixedly, accessories such as a circular grill 18 (or a pan), of substantially the same diameter.

The removable frame 13 intended to support the rotatable frame 16 has at least one first circular metal filiform element 37 for supporting the rotatable frame 16, and the first circular filiform element 37 is supported from diametrically opposite sides by second and third shaped filiform elements 19 in turn slidably engaged in grooves 14 of the side walls of the cooking chamber.

The actuation means 17 preferably have a magnetic motion transmission between a pinion 22 and the rotatable frame 16, which in such a case is metallic.

The pinion 22 is therefore made from magnetic material, for example a permanent magnet, and is arranged with its rotation axis horizontal so that its lateral surface is in contact with the bottom surface of the rotatable frame 16.

The pinion 22 is actuated by the shaft of a motor 23 positioned preferably in the space between a side wall of the casing 2 and the adjacent lateral side of the cooking chamber 3, and exerts an attraction on the contact surface with the rotatable frame 16 avoiding sliding thereof.

In a different configuration the motor 23 could also be behind the cooking chamber.

The magnetic transmission of rotary motion between the pinion 22 and the rotatable frame 16, as well as ensuring perfect effectiveness even when one of the two parts is greasy, is particularly quiet, does not have problems of interlocking and can easily be inspected and cleaned.

The magnetic pinion 22 can be made with a cylindrical permanent magnet having opposite polarities at its ends, or else with a plurality of magnetic discs and non-magnetic metal discs piled alternately with two non-magnetic metal discs at the ends. In the second case it is possible to obtain an increase in magnetic flow density through the lateral surface of the pinion 22 and at the same time to limit the force of the magnetic field directed axially.

The transmission of motion between the pinion 22 and the rotatable frame 16 can also be of the mechanical type, in a first case foreseeing a high-friction coating of the pinion 22, for example made from rubber, in a second case foreseeing a toothing of the pinion 22 that engages with a rack arranged circumferentially on the rotatable frame 16.

Of course, the rotation of the rotatable frame 16 can be enabled or disabled by the operator through a suitable button that commands the opening/closing of a switch of an electric power supply circuit of the motor 23.

According to another aspect of the invention, the oven 1 has ejection means of the removable frames 13, preferably able to be actuated by the opening/closing of the door 5.

Such ejection means comprise a linkage 25 housed in the space existing between a lateral side 27 of the cooking chamber 3 and the casing 2 of the oven 1, preferably in the same space where the motor 23 is found.

The linkage 25, arranged in a vertical plane, comprises an equalizer 26 hinged at 50 to the lateral side 27 and/or to the casing 2 and having a first arm 28 hinged to a connection shaft 29 with the door 5 and a second command arm 30 of a thruster element 31 of the removable frames 13.

The shaft 29 is hinged to the end of the equalizer 26 and to the door 5, in particular at a vertical edge thereof. The thruster element 31 has a first part 32 outside the cooking chamber 3 and slidably engaged in a slot 33 of the second arm 30 of the equalizer 26, and a second part 34 inside the cooking chamber 3 and slidably engaged in an open mesh 35 in particular behind the removable frames 13.

The first part 32 of the thruster element 31 is fixed to a substantially vertical rotation axis 38 and has at least one is first element with horizontal longitudinal extension 39 engaged with the slot 33.

The second part 34 of the thruster element 31 has a second element with vertical longitudinal extension 40 engaged in the open mesh 35 of the frames 13.

The slot 33 is preferably angular in shape so that the first element with horizontal longitudinal extension 39 is engaged with one of the sides of the slot 33 when the door 5 is in open position and with the other side when the door 5 is in closed position.

The operation of the oven according to the invention is clear from what has been described and illustrated and, in particular, is substantially the following.

Let us suppose that two different foods must be cooked in the oven, one of which, arranged on the rotatable frame 16, needs to be rotated in order to be cooked more homogeneously. After having set the cooking time and temperature and having enabled the rotation of the frame 16, the operator closes the door 5 and switches on the oven.

After the oven has been switched on, the motor 23 periodically or continuously makes the pinion 22 rotates, which transmits its rotation to the frame 16, determining the rotation of the food supported by it.

At the end of cooking of one or both of the foods, the operator opens the door 5.

During the opening of the door 5, the shaft 29 makes the equalizer 26 rotate, the slot 33 of the equalizer 26 in turn makes the thruster element 31 rotate, since it is engaged with the first element with horizontal longitudinal extension 39 of the thruster element 31, and the second element with vertical longitudinal extension 40 of the thruster element 31 goes from a first withdrawn operating position substantially close to the rear side of the cooking chamber 3 to a second advanced operating position towards the front side of the cooking chamber 3.

Since the element 40 is fixed to the open mesh 35 of the removable frames 13, as it advances it also drags them forwards to the point of partially ejecting them from the cooking chamber 3.

The element 40 comes out from the open mesh 35 during advancing to definitively free the frame 13.

The unhooking of the element 40 from the frames 13, for example for cleaning or inspection, takes place by pulling the frames 13, which at the end of the opening stroke of the element 40 are disengaged from it.

In the reverse operation, by closing the oven door, the element 40 in its curved return trajectory once again engages in the open mesh 35 of the removable frames 13 pulling them towards the inside of the cooking chamber.

The oven thus conceived can undergo numerous modifications and variations, all of which are covered by the inventive concept; moreover, all of the details can be replaced with technically equivalent elements.

In practice, the materials used, as well as the sizes, can be whatever according to the requirements and the state of the art.

The invention claimed is:

1. An electric oven comprising:
   a housing defining a cooking chamber;
   guides in the chamber;
   a rack slidable inside the housing on the guides;
   a door hinged on the housing and pivotal between an open position and a closed position; and
   means including a linkage between a side wall of the cooking chamber and the housing for automatically ejecting the rack on movement of the door into the open position, the linkage being oriented in a vertical plane and having
      a lever pivoted in the housing outside the chamber and having a first arm and a second arm;
      a link connecting the first arm of the lever to the door such that the lever pivots when the door moved between its positions;
      a thruster element pivoted between the housing and the chamber and having a first outer part outside said cooking chamber and slidably engaged in a slot of said second arm of said lever, and a second inner part inside said cooking chamber and slidably engaged in an opening of said rack.

2. The electric oven defined in claim 1, further comprising at least one rotatable rack supported by one of said removable racks, and
rotation actuation means for said rotatable rack positioned peripherally and tangentially to it.

3. The electric oven according to claim 2 wherein said rotatable rack has a circular outer perimeter.

4. The electric oven according to claim 1 wherein the rack consists of one or more metal wire elements.

5. The electric oven according to claim 2 wherein said actuation means comprise a pinion engaged with a circumferential edge surface of said rotatable rack.

6. The electric oven according to claim 5 wherein said actuation means have a magnetic type transmission between said pinion and said rotatable rack.

7. The electric oven according to claim 6 wherein said pinion consists of a cylindrical permanent magnet, and in that said rotatable rack is made from magnetic metal.

8. The electric oven according to claim 6 wherein said pinion consists of a series of magnetic metal discs piled alternately with non-magnetic metal discs, and ending at the opposite ends with one of said non-magnetic metal discs, and in that said rotatable rack is made from magnetic metal.

9. The electric oven defined in claim 6 wherein said actuation means have a mechanical type transmission between said pinion and said rotatable rack.

10. The electric oven defined in claim 6 wherein said pinion has a high-friction coating coupling with said circumferential edge surface.

11. The electric oven defined in claim 6 wherein said pinion has teeth meshing with a rack formed along said circumferential edge surface.

12. The electric oven defined in claim 6 wherein said pinion has a horizontal rotation axis.

13. The electric oven defined in claim 6 wherein said actuation means comprise a rotation actuation motor of said pinion, positioned in the space between the housing of said oven and a lateral side of said cooking chamber.

14. The electric oven defined in claim 1 wherein said first outer part is fixed to a substantially vertical rotation axis and has at least a first element with horizontal longitudinal extension engaged with said slot.

15. The electric oven defined in claim 14 wherein said second inner part has a second vertically extending element engaged in said open mesh of said one or more removable racks.

16. The electric oven defined in claim 15 wherein said opening is at the rear of the chamber.

17. The electric oven defined in claim 14 wherein said slot is L-shaped and said first element is engaged with one leg of said slot when said door is in the open position and with another leg of the slot when the door is in the closed position.

* * * * *